United States Patent [19]

Furukawa

[11] 4,300,470
[45] Nov. 17, 1981

[54] LUMINANT POINTER FOR METERS
[75] Inventor: Noriyuki Furukawa, Shimada, Japan
[73] Assignee: Yazaki Sogyo Kabushiki Kaisha, Tokyo, Japan
[21] Appl. No.: 89,516
[22] Filed: Oct. 30, 1979
[30] Foreign Application Priority Data
Nov. 10, 1978 [JP] Japan ............................. 53-154020[U]
[51] Int. Cl.³ .......................................... G01D 13/22
[52] U.S. Cl. ..................................... 116/332; 116/288
[58] Field of Search ....................... 116/288, 263, 332; 350/96.1, 96.19

[56] References Cited
U.S. PATENT DOCUMENTS

| 2,843,664 | 7/1958 | Olin | 350/96.10 |
| 2,900,949 | 8/1959 | Baker | 116/288 |
| 3,033,155 | 5/1962 | Beckman | 116/288 |
| 4,068,121 | 1/1978 | Bringhurst | 350/96.19 |

Primary Examiner—Gerald Goldberg
Assistant Examiner—Denis E. Corr

Attorney, Agent, or Firm—Oldham, Oldham, Hudak & Weber Co.

[57] ABSTRACT

A luminant pointer for use in a meter is disclosed, which comprises a finger portion having a trapezoidal sectional shape with the transverse width of its upper face being selected to be longer than that of its lower face, and a layer of color paint provided on the lower face of the finger portion. The entire upper face of the finger portion of the pointer having such a construction can thus glow with the color of the paint in spite of the fact that the color paint layer is provided merely on the lower face having a considerably smaller area than that of the upper face of the finger portion of the pointer. Therefore, the amount of the paint required for the luminant indication purpose is decreased to reduce the rate of absorption of light by the paint, thereby obviating the tendency of sharp reductions in the intensity of light advancing from the radially inner end toward the radially outer end of the finger portion of the pointer on the meter dial.

2 Claims, 10 Drawing Figures

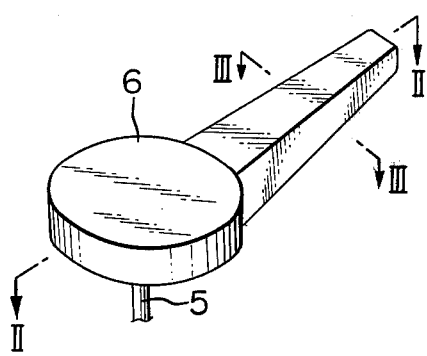
FIG. 1
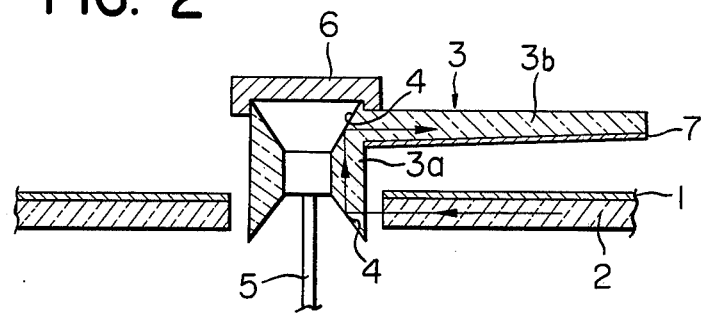
FIG. 2
FIG. 3
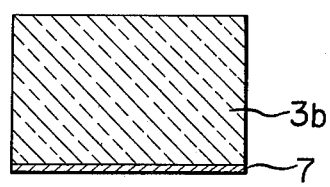
FIG. 4
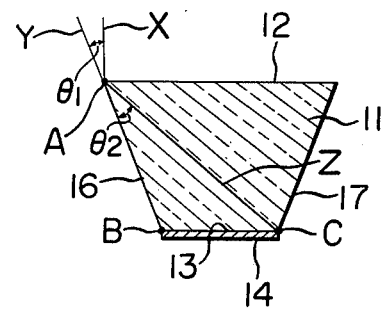
FIG. 5a    FIG. 5b    FIG. 5c
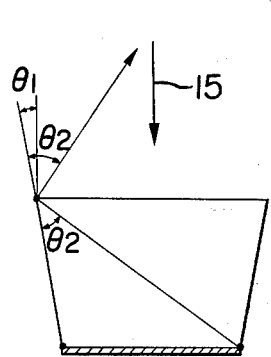 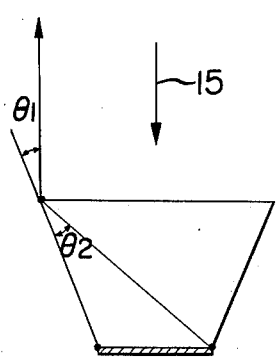 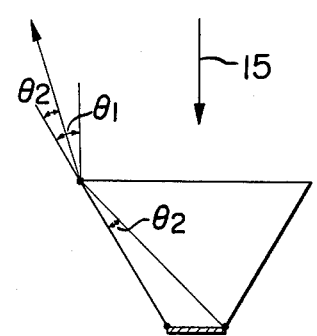
FIG. 6a    FIG. 6b    FIG. 6c
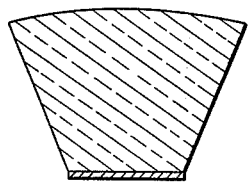 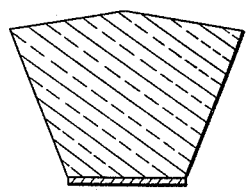 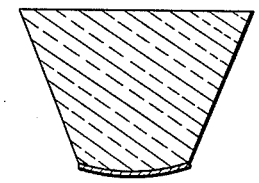

LUMINANT POINTER FOR METERS

This invention relates to an improvement in a luminant pointer for use in meters for automobiles and like vehicles.

In modern meters for vehicles such as automobiles, various proposals have been made so as to improve the visibility of the meters in the nighttime. It has thus been the recent trend to mold the pointer from a transparent acrylic resin or like material and to guide light from a light source toward and into the transparent pointer for illuminating the pointer itself, besides the usual means for illuminating the meter dial.

One form of a conventional luminant pointer employed hitherto in such a meter will be described with reference to FIGS. 1 and 2 by way of example. Referring to FIGS. 1 and 2, a plate 2 of light transmitting material is fixed to the lower face of a meter dial 1 to permit transmission of light directed from a light source (not shown). A pointer 3 comprises a base or light receiving portion 3a and a finger portion 3b to be illuminated with light and is rotatably mounted on a pivot 5 at its light receiving poriton 3a. The pointer 3 receives light transmitted through the light transmitting plate 2 at the entire outer periphery of the light receiving portion 3a disposed opposite to the associated end of the plate 2, and light received by the light receiving portion 3a is then reflected by a plurality of reflecting planes 4 formed thereon to be finally directed into the finger portion 3b of the pointer 3.

As best shown in FIG. 2, a cap 6 of opaque material is fitted on the light receiving portion 3a of the pointer 3 to conceal the pivot 5 from view and also to prevent leakage of light at the light receiving portion 3a of the pointer 3 receiving light from the light source via the light transmitting plate 2.

In order that the finger portion 3b of the pointer 3 can glow with a specified color such as red in the luminant pointer construction of this kind, the pointer 3 is generally molded from a transparent resin material colored in the specified color such as red. Alternatively, the pointer 3 is molded from a colorless transparent resin material, and a layer 7 of paint of the specified color is coated or printed on the lower face of the finger portion 3b of the pointer 3 thus molded, as seen in FIGS. 2 and 3.

However, the pointer obtained by any one of these methods has been defective in that the luminance of the finger portion 3b of the pointer 3 tends to be sharply reduced from the radially inner end toward the radially outer end of the finger portion 3b of the pointer 3 on the meter dial 1. This is because light advancing toward the radially outer end of the finger portion 3b of the pointer 3 is subject to sharp attenuations due to the absorption of light by the paint layer 7 in the case of the construction having the paint layer 7 coated or printed on the lower face of the finger portion 3b of the pointer 3, or due to the absorption of light by the pigment contained in the resin material in the case of the construction molded from the colored resin material.

Such a defect may be obviated by increasing the intensity of light directed from the source toward and into the pointer 3 or by windening the sectional area of the pointer 3. However, an attempt to increase the intensity of light directed from the source toward and into the pointer 3 requires costly reconstruction of the electrical system, and also, an attempt to widen the sectional area of the pointer 3 results inevitably in a great increase in the weight of the pointer 3. In order that the accuracy of indication and the durability of the meter may not be degraded, the meter drive force must be increased, and the mechanical strength of the meter must also be increased, resulting inevitably in a great deal of labors and an undesirable increase in the manufacturing cost.

With a view to obviate such a prior art defect, the inventors have made researches and studies in an effort to provide an improved pointer of this kind capable of glowing at a better efficiency without the necessity for the intensification of light directed from the source toward and into the pointer and also without the necessity for the great increase in the weight of the pointer. As the results of the researches and studies, the inventors have found that an improved pointer of this kind can be provided when the finger portion of the pointer has a trapezoidal sectional shape with the transverse width of its upper face being selected to be longer wider than that of the lower face, and a color paint layer is provided on the lower face of the finger portion of the pointer. The entire upper face of the finger portion of the pointer having such a construction can thus glow with the color of the paint in spite of the fact that the color paint layer is provided merely on the lower face having a considerably smaller area than that of the upper face of the finger poriton of the pointer. Therefore, the amount of the paint required for the luminant indication purpose is decreased to reduce the rate of absorption of light by the paint, thereby obviating the tendency of sharp reductions in the intensity of light advancing from the radially inner end toward the radially outer end of the finger portion of the pointer on the meter dial.

Preferred embodiments of the luminant pointer according to the present invention will now be described in detail with reference to the accompanying drawings.

FIG. 1 is a perspective view showing one form of a conventional luminant pointer in a meter, by way of example.

FIG. 2 is a sectional view taken along the line II—II in FIG. 1 to illustrate how the luminant indication is provided by the pointer shown in FIG. 1.

FIG. 3 is an enlarged sectional view taken along the line III—III in FIG. 1.

FIG. 4 is a view similar to FIG. 3 but showing, in section, one form of the finger portion of the pointer in an embodiment of the present invention.

FIGS. 5a, 5b and 5c show comparative examples of the sectional shape of the finger portion of the pointer according to the present invention.

FIGS. 6a, 6b and 6c are views similar to FIG. 4 but showing three other different embodiments of the present invention.

Referring now to FIG. 4, an embodiment of the improved pointer according to the present invention comprises a finger portion 11 molded from a transparent acrylic resin or like material. It will be seen in FIG. 4 that this finger portion 11 has a trapezoidal sectional shape with the transverse width of its upper face 12 being selected to be longer than that of its lower face 13, and a layer 14 of color paint is provided on the lower face 13 of the finger portion 11. The paint has a color such as red or yellow specified for the pointer, and the paint layer 14 is coated or printed on the lower face 13 of the finger portion 11.

According to the present invention, the finger portion 11 of the pointer is shaped in the form of the trapezoid in its sectional shape with the transverse width of its upper face 12 being selected to be longer than that of its lower face 13, and the color paint layer 14 is provided on the lower face 13 of the finger portion 11 of the pointer, in the manner above described. The entire upper face 12 of the finger portion 11 of the pointer can thus glow with the specified color in spite of the fact that the color paint layer 14 is provided merely on the lower face 13 having a considerably smaller area than that of the upper face 12 of the finger portion 11 of the pointer. Therefore, the amount of the paint required for the luminant indication purpose is decreased to reduce the rate of absorption of light by the paint, thereby obviating the tendency of sharp reductions in the intensity of light advancing from the radially inner end toward the radially outer end of the finger portion of the pointer on the meter dial, so that the driver can more clearly recognize the value indicated by the pointer on the meter dial.

The reduction in the weight of the luminant pointer provides such an additional advantage that any increase in the meter drive force is unnecessary. Further, due to the fact that the paint coating area or paint printing area of the finger portion of the pointer is considerably narrowed to less than hitherto as described hereinbefore thereby reducing the rate of absorption of light by the paint and also reducing the weight of the luminant pointer, the present invention provides such another additional advantage that the length of the finger portion of the pointer can be increased without the necessity for increasing the intensity of light directed from the source toward and into the finger portion of the luminant pointer and also without the necessity for increasing the drive force for the luminant pointer.

The pointer according to the present invention provides the aforementioned particular advantages over the prior art because of the trapezoidal sectional shape of its finger portion 11 with the transverse width of the upper face 12 being selected to be longer than that of the lower face 13. The driver will be able to clearly view the luminant pointer on the meter dial with better visibility when the angle of the side faces 16 and 17 of the trapezoidal finger portion 11 is so selected that the beams of light reflected from the opposite side edges of the paint layer 14 on the lower face 13 of the finger portion 11 are then reflected forward from the opposite ends of the upper face 12 of the finger portion 11 in a relation substantially orthogonal to the upper face 12.

A manner of selection of such an optimum angle will be described with reference to FIG. 4. As shown in FIG. 4, a line X is depicted which extends from one end A of the upper face 12 in a relation orthogonal with respect to the upper face 12, and another line Y is depicted which extends from one end B of the lower face 13 on the same side as the end A of the upper face 12 and passes through the end A of the upper face 12. These lines X and Y define an angle $\theta_1$ therebetween as shown. Another line Z is also depicted which extends from the end A of the upper face 12 to the other end C of the lower face 13, that is, the end diagonal with respect to the end A. This line Z and the aforementioned line Y define an angle $\theta_2$ therebetween, as shown.

Suppose that the angles $\theta_1$ and $\theta_2$ thus defined have a relation $\theta_1 < \theta_2$ therebetween as shown in FIG. 5a. Then, the beam of light reflected from the side edges C of the lower face 13, hence, from the corresponding end of the color paint layer 14 will be reflected forward, but inward relative to the normal, from the side edge A of the upper face 12. Suppose that the angles $\theta_1$ and $\theta_2$ have a relation $\theta_1 = \theta_2$ or $\theta_1 \fallingdotseq \theta_2$ therebetween as shown in FIG. 5b, then, the beam of light will be reflected substantially straight forward from the edge A of the upper face 12. Suppose that the angles $\theta_1$ and $\theta_2$ have a relation $\theta_1 > \theta_2$ therebetween as shown in FIG. 5c, then, the beam of light will be reflected forward, but outward relative to the normal, from the edge A of the upper face 12.

The viewing direction by the eyes of the driver is shown by the arrow 15 in FIGS. 5a to 5c, and this direction is orthogonal with respect to the upper face 12 of the finger portion 11 of the pointer. It is apparent that the pointer is most clearly visible to the eyes of the driver when $\theta_1 = \theta_2$ or $\theta_1 \fallingdotseq \theta_2$ as shown in FIG. 5b.

Therefore, the point B is initially determined so as to satisfy the relation $\theta_1 = \theta_2$ or $\theta_1 \fallingdotseq \theta_2$, and then, the line Y connecting between the points A and B is selected to provide the side face 16 of the trapezoidal finger portion 11 of the pointer. The side face 17 opposite to the side face 16 defined by the aforementioned line Y is similarly determined since its inclination is the same as that of the side face 16.

The upper face or lower face of the trapezoidal finger portion of the pointer may have a curved or angled contour as shown in FIGS. 6a, 6b and 6c, provided that the condition for determining the angle of the side faces in the manner above described is satisfied.

It is apparent that the present invention is in no way limited to its application as a luminant pointer for use in meters for automobiles and like vehicles and is equally effectively applicable to various other types of meters.

I claim:

1. A luminant pointer for use in a meter, comprising a base portion of transparent material receiving light from a light source, a finger portion of transparent material having upper and lower faces and being coupled integrally with said base portion which directs light toward and into said finger portion, said finger portion having a trapezoidal sectional shape with the transverse width of its upper face being wider than that of its lower face, a layer of color paint provided on said lower face of said finger portion; and the angle of the side faces of said finger portion of trapezoidal section being determined to satisfy the relation $\theta_1 = \theta_2$ or $\theta_1 \fallingdotseq \theta_2$ between a first angle $\theta_1$ and a second angle $\theta_2$, wherein said first angle $\theta_1$ is that defined between a first line extending from one side edge of the upper face of said finger portion of trapezoidal section in a relation orthogonal with respect to the upper face and a second line extending from one side edge of the lower face on the same side as said side edge of the upper face and passing through said side edge of the upper face, and said second angle $\theta_2$ is that defined between said second line and a third line extending from said side edge of the upper face to the diagonal side edge of the lower face of said finger portion.

2. A luminant pointer for use in a meter, comprising a base portion of transparent material receiving light from a light source, a finger portion of transparent material having an upper, a lower and two side faces and being coupled integrally with said base portion which directs light toward and into said finger portion, said finger portion having a trapezoidal sectional shape with the transverse width of its upper face being wider than that of its lower face, a layer of color paint provided on said lower face of said finger portion; and the angles between the side faces and the upper and lower faces of said finger portion of trapezoidal section make the light reflected from the edges of said color paint layer reflect substantially straight upwardly from the opposite edges of the said upper face of said finger portion.

* * * * *